Jan. 19, 1960 K. R. McCONNELL 2,921,977

FACSIMILE SYSTEMS AND MACHINES

Filed July 22, 1954 3 Sheets-Sheet 1

INVENTOR.
KENNETH R. McCONNELL
BY John J. Rogan
ATTORNEY.

Jan. 19, 1960 K. R. McCONNELL 2,921,977

FACSIMILE SYSTEMS AND MACHINES

Filed July 22, 1954 3 Sheets-Sheet 2

INVENTOR.
KENNETH R. McCONNELL
BY John J. Rogan
ATTORNEY.

INVENTOR.
KENNETH R. McCONNELL
BY
John J. Rogan
ATTORNEY.

United States Patent Office 2,921,977

Patented Jan. 19, 1960

2,921,977

FACSIMILE SYSTEMS AND MACHINES

Kenneth R. McConnell, Fairhaven, N.J., assignor, by mesne assignments, to Times Facsimile Corporation, New York, N.Y., a corporation of Delaware Application July 22, 1954, Serial No. 445,054

12 Claims. (Cl. 178—7.1)

This invention relates to facsimile apparatus and more particularly it relates to apparatus for scanning and recording intelligence by electro-optical means.

A principal object of the invention relates to an improved facsimile scanner of the kind using light reflected from an original subject matter to be transmitted, and having auxiliary means whereby undesirable markings are avoided in the recorded copy.

Another object is to provide a scanning arrangement for a facsimile transmitter machine, whereby the facsimile intelligence signals are generated by light reflected from the scanned subject matter, and the recorded copy is produced substantially free from undesired markings which would ordinarily occur when the scanned subject matter has smaller dimensions than the normal scanning traverse of a scanning head or the like.

A feature of the invention relates to a scanning arrangement for a facsimile machine employing a scanning head which is arranged to move across a predetermined width of a scanning drum to scan the subject matter by reflected light, in conjunction with an auxiliary electro-optically controlled circuit which comes into action at those regions where the subject matter does not cover the peripheral surface of the scanning drum.

Another feature relates to a novel scanning arrangement for a facsimile transmitter machine having a transparent scanning drum, and two light sensitive cells, one of which is responsive to light reflected from the subject matter being scanned, and the other of which is responsive to light transmitted through the scanning drum at those regions where it is not masked by the said subject matter.

A further feature relates to a facsimile transmitter and recording machine having an electro-optical signal generating circuit with a gating control element, the gating control element being provided with a control circuit which gates the signals off when the scanning device at the transmitter is moving beyond the edges of the subject matter being scanned.

A further feature relates to the novel organization, arrangement, and relative location and interconnection of parts which cooperate to provide an improved facsimile transmitting and reproducing apparatus.

Figures 1, 2, 3:
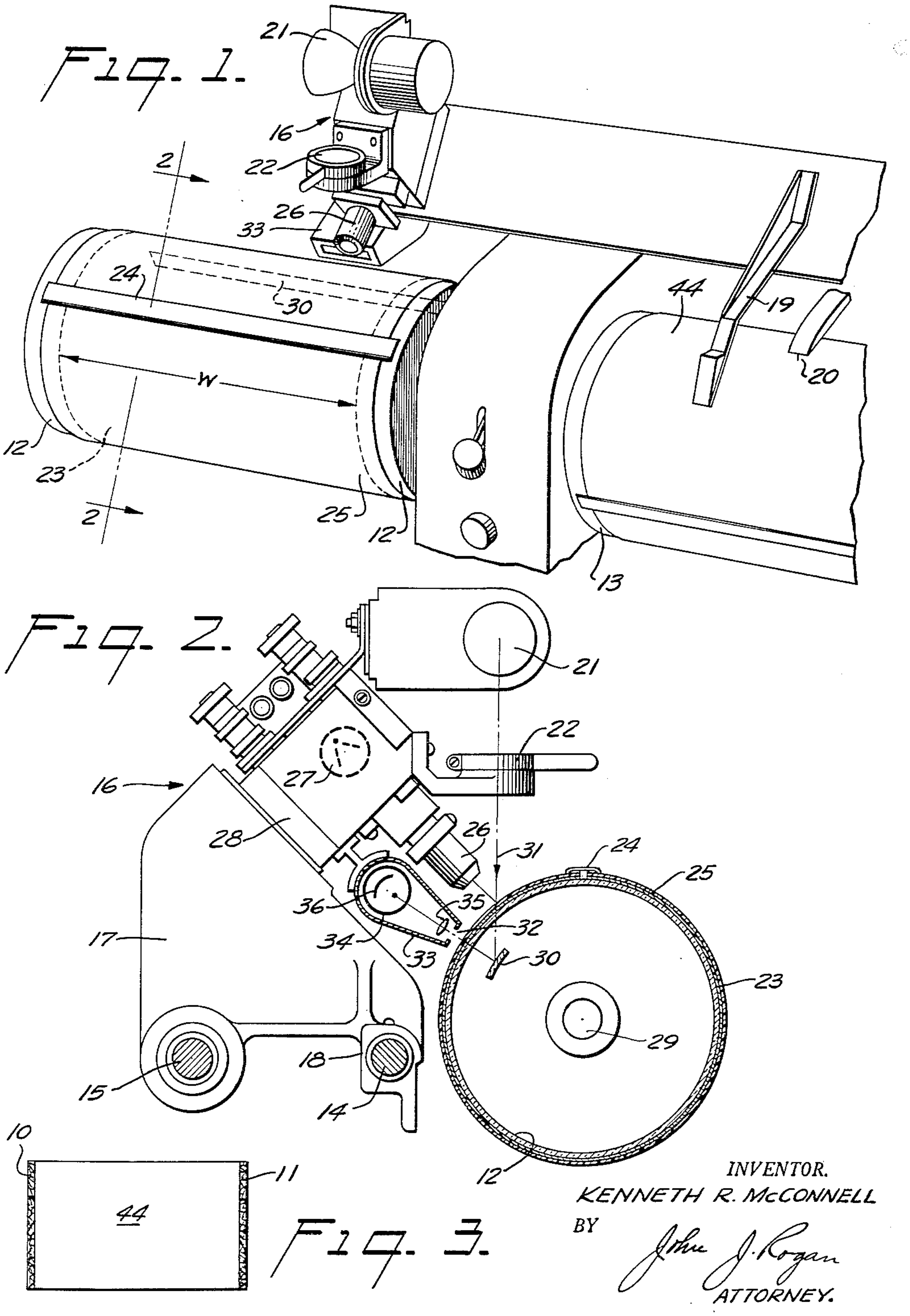
Fig. 1 is a perspective front view of part of a facsimile transmitter-recorder machine embodying the invention.
Fig. 2 is a sectional view of Fig. 1 taken along the line 2—2 thereof.
Fig. 3 is a reduced plan view of the recorded blank using the conventional scanning mechanism and showing certain undesired border markings in the recorded copy.

While, for simplicity in the drawing, the invention will be illustrated as embodied in one known type of facsimile transmitter-recorder machine, it will be understood that this is done merely for explanatory purposes and not by way of limitation thereto. In general, facsimile transmitters comprise a suitable support for the subject matter to be transmitted, which support is usually in the form of a rotary drum, usually referred to as a scanning drum. In conventional machines, this drum is usually of metal or other non-transparent material around which the subject matter is wrapped and clamped in any well known manner. Such machines are intended to accommodate the transmission of sheets of subject matter of different widths or different lengths. Of course, the maximum width of subject matter that can be accommodated is the length of the scanning drum. In many cases, however, the subject matter is in the form of a sheet whose width or length does not mask the full peripheral area of the drum. The scanning head which scans the subject matter on the drum is, of course, designed to execute a maximum length of scanning traverse corresponding to the maximum width of the sheet of subject matter. Consequently, if the width of the sheet of subject matter to be scanned does not cover the length of the drum, or if the sheet length does not extend around the entire drum periphery, there is a margin at either or both ends of the drum, or a gap between the ends of the sheet, which is not masked by that sheet. The scanning head under such conditions will be obliged to scan each transverse linear strip of the sheet and will also scan the portion of the drum surface which is unmasked by the said sheet. Under those conditions at the recorder machine the recording blank which usually covers the entire drum length and periphery will show undesired border markings, as indicated by the numerals 10, 11 (Fig. 3). In certain cases it may be desirable to transmit subject matter on a plurality of separate sheets each of which is much smaller than the drum area. Heretofore the mounting of such small sheets on the drum has resulted in their reproduction with undesirable markings between the non-contiguous edges of the sheets. Thus, if the sheets were of irregular shape, it would be impossible to fit them together without leaving unmasked drum areas. With the arrangement as described herein, the various sheets or sheet sections can be assembled or fitted together and placed on the drum in any desired array, and can be held flat against the drum by the overlying plastic sheet 25. Furthermore, sometimes the transmitted sheet contains cut-outs or stenciled portions which would ordinarily result in undesirable markings in the recorded copy. The present invention overcomes that difficulty.

Attempts have been made to solve this problem by painting the surface of the transmitter scanning drum white so that if the sheet of subject matter is of a white background, the reproduced copy does not show the undesired border markings above noted. However, it is difficult, if not impossible, completely to match the whiteness of the painted drum surface with the whiteness of the background of the subject matter. In any event, if the background of the subject matter is not white, for example if it is a sheet of yellow or some other colored paper, the problem is not solved. Furthermore, since the sheet of subject matter has appreciable thickness, the surface of the drum is at a different optical distance from the actual scanned surface of the sheet of subject matter. Thus, even with the completely white surfaced drum and a white background sheet of subject matter, a variation in signal occurs as the scanning head leaves the edge of the subject matter.

The present invention overcomes the above difficulties. For example, as shown in Figs. 1 and 2, the transmitting scanning drum 12 may be mounted on the same shaft as the recording scanning drum 13 so that both drums rotate in perfect synchronism. In accordance with the invention, the drum 12 is made of glass, or other light transparent material such as clear plastic. The receiver scanning drum 13 can be of any conventional construction. Mounted in spaced parallelism with respect to the drums 12 and 13, is the threaded lead screw 14 and a cylindrical guide rod 15. A longitudinally movable scanning head designated by the numeral 16 may comprise a carriage 17 having a cylindrical bore to enable the carriage to slidably ride along the guide rail 15. The carriage 17 may also carry a suitable half-nut 18 which cooperates with the lead screw 14 so that as the lead screw 14 is continuously rotated the scanning head 16 moves parallel to the longitudinal axis of the drum 12.

Carriage 17 also carries a suitable recorder head 19 which may carry a recording stylus 20 for recording on the record sheet on drum 13. The carriage 17 also carries a light source or exciter lamp 21 and a condenser lens 22 for focusing the light from source 21 in a minute spot upon the surface of the sheet 23 which is wrapped around drum 12. Sheet 23 can be snugly held around drum 12 by any suitable form of releasable clamping bar 24. Preferably, a thin sheet of transparent plastic 25 may also be wrapped around the drum 12 after applying the sheet 23. The carriage 17 also carries an objective lens system 26 by means of which the light reflected from the illuminated spot on the subject matter sheet 23 is projected on to the main photoelectric cell 27 which is mounted within a suitable light-tight housing 28 carried by the carriage 17. In the well known manner, the shaft 29 which carries the drums 12 and 13 is driven through suitable gears (not shown) in timed relation to the rotation of the lead screw 14. Likewise, in the well known manner as a result of this action, the sheet of subject matter 23 is completely scanned in a continuous helical trace and the scanning results in corresponding excitations of the photo-electric cell 27.

The machine may be of any construction well known in the facsimile art and is so designed that the scanning head causes the electro-optical system thereof to scan substantially the complete length of the drum or at least a length corresponding to the widest sheet of subject matter that is to be transmitted. If, therefore, the sheet 23 has a width "W" which is less than this predesigned maximum scanning traverse of head 16, the portion of the drum which is not obscured or masked by the sheet 23 will provide a clear path for the light from lamp 21 through the transparent drum 12 and plastic sheet 25 and thence to a mirror 30 which is suitably and stationarily mounted within the hollow drum 12. This mirror 30 is so located that the light beam 31 after passage through the wall of drum 12 strikes the said mirror and is reflected through an aperture 32 in a stationary light-tight housing 33 which is attached to carriage 17 below the lens 26 as seen in Fig. 2. Consequently, when the light beam 31 leaves the edge of the sheet 23 it excites the photo-cell 34. If desired, a suitable optical system represented schematically by the lens 35 may project the light reflected from mirror 30 upon the photo-sensitive cathode 36 of cell 34. Therefore, the cell 34 responds only to the light which passes through the unmasked portions of the drum 12 and as reflected by the mirror 30, and it does not respond to the light which is reflected from the subject matter sheet 23, which is substantially opaque.

Figures 7, 8:
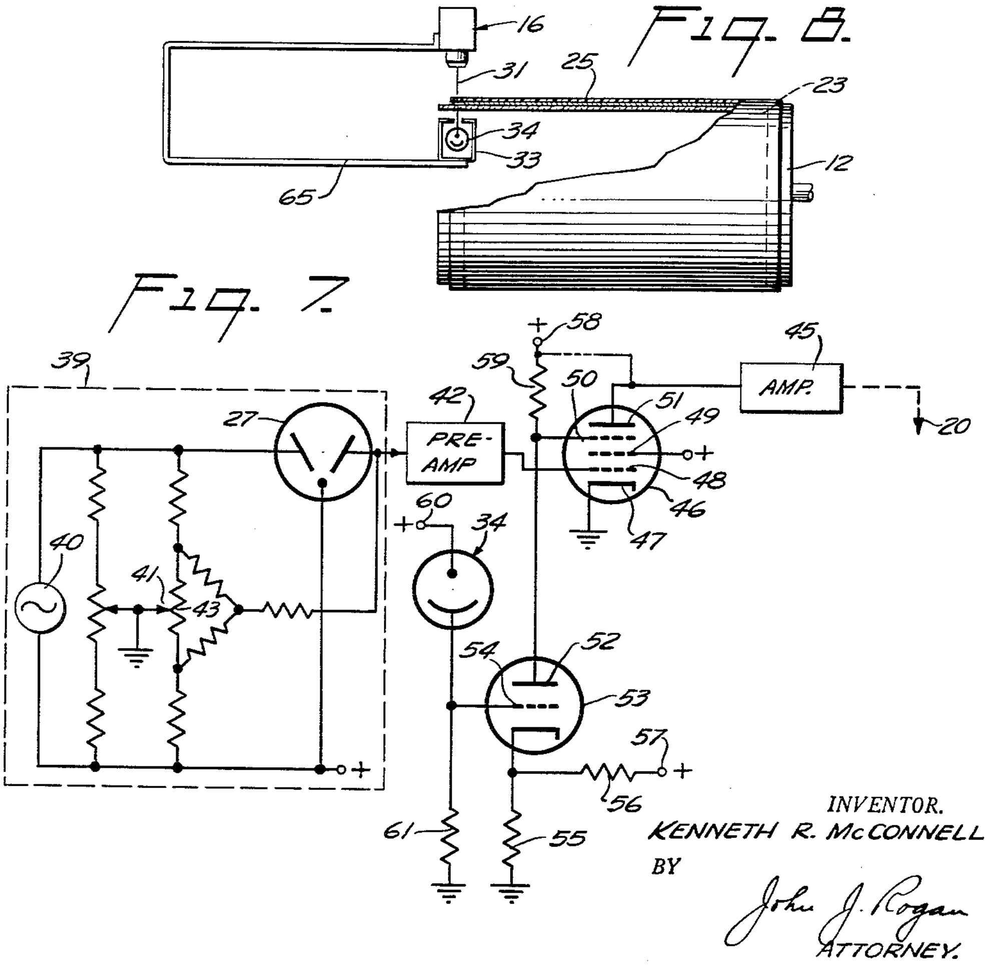
Fig. 7 is a schematic wiring diagram of a typical gating control circuit used in practising the invention.
Fig. 8 is a schematic structural diagram of a further modification of Figs. 1 and 2.

The auxiliary cell 34 is used as a gating control device to gate on and off the facsimile signals picked up by the main cell 27. Fig. 7 shows a typical circuit that may be used for this purpose. The parts of Fig. 7 which are the same as those of Fig. 1 and Fig. 2 are designated by the same numerals. The cell 27 is connected in any suitable facsimile modulator unit 39, such for example as described in U.S. Patent No. 2,459,293, granted January 18, 1949. It may comprise a source 40 of audio frequency electric carrier waves, connected in circuit with a balancing bridge comprising a network of resistors as shown, and cell 27. The balancing bridge network includes an adjustable potentiometer contact 41 by means of which the output of the bridge, as supplied to the preamplifier 42, is correlated with the type of recording to be obtained, that is whether it is to be a negative or a positive recording. If contact 41 is moved to a point on one side of the center of its associated resistor 43, the bridge can be balanced, for zero output current. With such an adjustment, as black copy of sheet 23 is being scanned, the bridge becomes unbalanced so as to generate an output signal proportionate to or dependent upon the amount of illumination of cell 27, and thereby effecting positive recording upon the recording blank 44 wrapped around the recording drum 13.

Blank 44 may be any well known kind of electrosensitive recording sheet arranged to produce elemental markings or perforations when the facsimile signals are applied to the stylus 20. Blank 44 may be a paper blank such as disclosed in U.S. Patent No. 2,664,044, or it may be a stencil forming blank such as disclosed in U.S. Patent No. 2,644,043. It will be understood, of course, that the stylus 20 is energized in accordance with the output of amplifier 42. The output of preamplifier 42, instead of being connected directly to the main signal amplifier 45, is connected thereto through an on and off gating tube 46. Merely for illustration, the gating tube may be a triple grid electron tube or pentode having an electron emitting cathode 47, a first control grid 48, a positively biased shield grid 49, a second control grid 50, and an output anode 51, which output anode is connected to the input of amplifier 45. The output of preamplifier 42 is connected to control grid 48, whereas the control grid 50 is connected to the plate or anode 52 of another amplifier tube 53 whose control grid 54 is biased to plate current cut off by means of the voltage divider resistors 55, 56 connected between the positive terminal 57 and ground. Therefore, as long as cell 34 is unexcited by light, the tube 53 is non plate current conductive and therefore the grid 50 is biased from the positive terminal 58 through voltage divider resistor 59 so as to permit plate current flow through tube 46 as long as facsimile signals are being applied to the control grid 48.

On the other hand, when the cell 34 is excited by the light beam 31 as reflected from the mirror 30 through the unmasked portions of drum 14, current flows from the positive terminal 60 through the cell 34 and resistor 61 to ground. The voltage thus developed across resistor 61 biases the control grid 54 in the positive direction to permit plate current flow through tube 53. The tube 53 forms with the resistor 59 a voltage divider so that when tube 53 becomes plate current conductive, it biases the grid 50 to plate current cut off. Therefore, if the background of the sheet 23 is white, the entire background on the recording sheet 44 will remain uniform and free from the objectionable border markings 10, 11, described above in connection with Fig. 3. It will be understood, of course, that the invention is not limited to the use of subject matter sheets 23 of white background, since the amount of light reflected from the mirror 30 on to the auxiliary cell 34 is independent of the color of the background of sheet 23.

Figure 4:
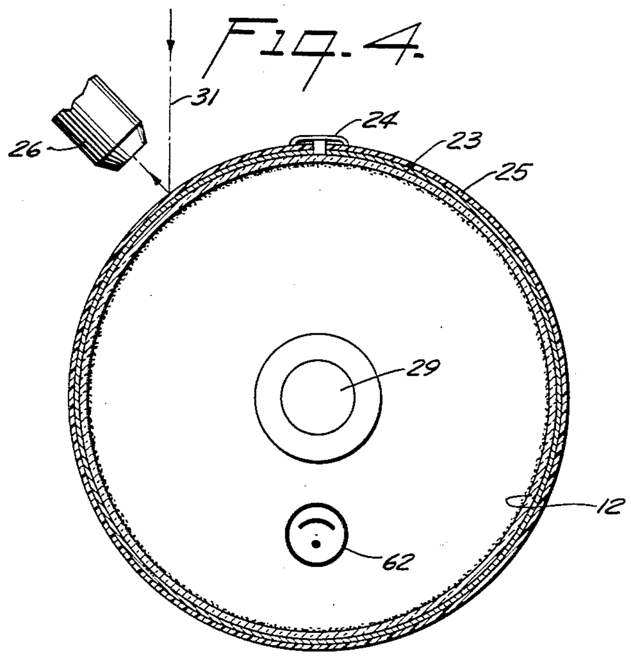
Fig. 4 is a sectional view of part of a modified machine according to the invention.

Fig. 4 shows in schematic form a modification of Fig. 1 and Fig. 2 wherein the gating control is effected by means of a single auxiliary photo-sensitive cell 62 which can be stationarily mounted within the light transmitting drum 12. In this embodiment, the entire inner surface of the drum 12 can be frosted or light reflecting. Thus, when the scanning light beam 31 passes through the portions of the drum which are not covered by the subject matter sheet 23, the light beam 31 is transmitted through the wall of drum 12 and by reason of the reflecting or frosted internal surface of that drum it is reflected around the interior thereof so as to illuminate the cell 62 and thus apply the necessary gating control voltage to the control grid 54 of tube 53. The remainder of the embodiment of Fig. 4 may be the same as that of Figs. 1 and 2. In other words, the embodiment of Fig. 4 eliminates the internal mirror 30 and the external cell 34 with its respective optical system and light-tight housing.

Figure 5:
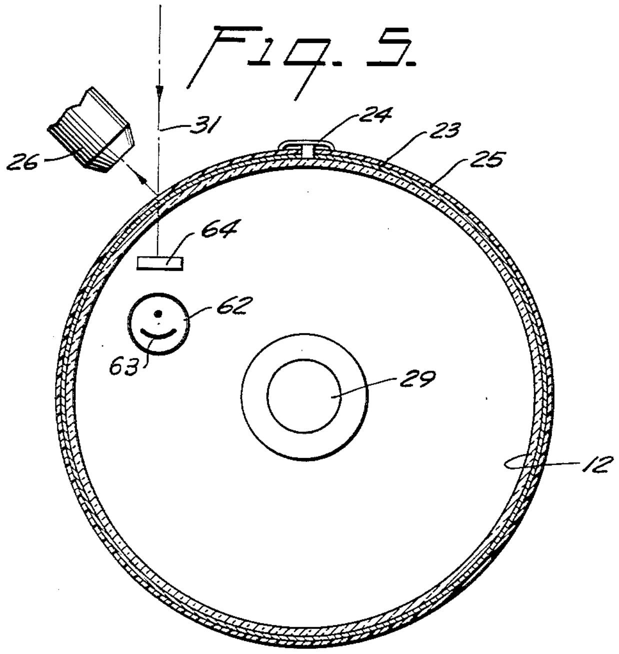
Fig. 5 is a sectional view of part of another modified machine according to the invention.
Figure 6:
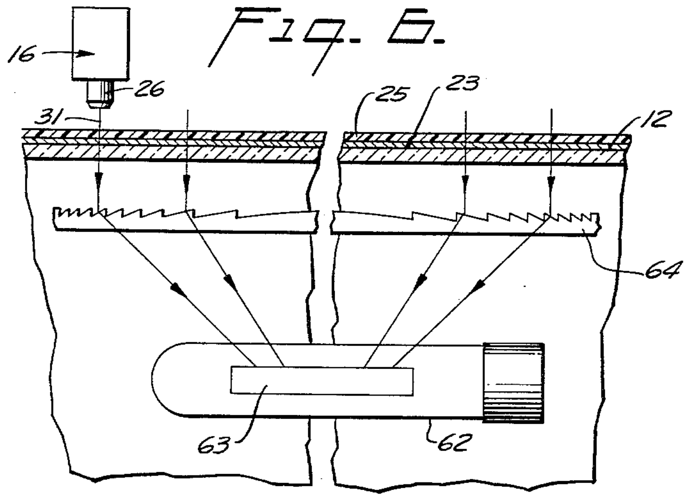
Fig. 6 is an enlarged detail view of certain parts of the modification of Fig. 5.

Figs. 5 and 6 show a further modification of Figs. 1 and 2 wherein the parts corresponding to those of Figs. 1 and 2 are designated by the same numerals. In this embodiment, a single auxiliary cell 62 is mounted interiorly of the transparent drum 12. The cell 62 may be of a kind having an elongated photo-sensitive cathode 63 so that it can pick up light transmitted through the unmasked portions of the drum 12. In order to make sure that the cell responds to the light beam transmitted through these unmasked portions of the drum, a Fresnel lens 64 may be mounted inside the drum 12 in optical alignment with the cell 62. Consequently, the scanning light beam 31 when it passes through the unmasked portions of the drum 12 is refracted so as to strike the photo-sensitive cathode 63 and thus produces the necessary gating control voltage on the control grid 54 (Fig. 7). It will be understood, of course, that in the embodiments of Figs. 4, 5, and 6, the drum is shielded to protect the cell 62 from any other light except that from the scanning beam 31.

Fig. 8 shows another embodiment wherein the drum 12 may be completely open at its left-hand end, and the auxiliary cell 34 may be mounted in the light-tight housing 33 which is carried by a bracket 65, which is also connected to the scanning head 16. With this arrangement the auxiliary cell 34 is always in planar alignment with the scanning beam 31, thus enabling a relatively small and single photoelectric cell 34 to be employed for generating the gating control voltage to be applied to the control grid 54 of the gating control grid 53, without the use of mirrors such as mirror 30, or a lens such as lens 64. It will be obvious from the embodiment of Fig. 8 that the cell 34 is excited only when the scanning beam 30 is permitted to pass through the transparent wall of drum 12 at those regions where the drum is unmasked by the subject matter sheet 23. In all the foregoing embodiments it will be understood that the paper clamp 24 does not have to be transparent to light.

While certain embodiments have been described herein, it will be understood that various changes and modifications may be made therein without departing from the spirit and scope of the invention.

Furthermore, while for the purpose of explaining the invention the transmitter scanning drum and the recorder scanning drum are directly connected by a common shaft, it will be understood that the recording drum may be located at a remote point from the transmitter drum, and may be driven in synchronism with the transmitting drum by any means well known in the facsimile transmission art. Furthermore, while the drawing shows a transmitter scanner which illuminates the subject matter by so-called flood-lighting from lamp 21, and the selection of the elemental areas by the minute aperture in the usual baffle in front of cell 27 and by the focusing action of lens 26, it will be understood that the subject matter can be illuminated by a minute focused elemental light spot, as is well known in the facsimile scanning art.

What is claimed is:

1. Facsimile apparatus comprising a support for a sheet of subject matter to be translated into corresponding electric facsimile signals, said support having at least one end portion of light transmitting material, means to hold said sheet on said support with a portion thereof only partially overlying said transparent portion of said support, a scanning head including means to generate a single scanning light beam to scan said sheet in successive elemental areas, means to produce relative motion between said support and head to bring successive elemental areas of said support into registry with said light beam, said head also including a main light sensitive cell which responds to light from said scanning beam which is reflected from said elemental areas, at least one auxiliary light sensitive cell which also responds to light from said scanning beam, and means to excite said auxiliary cell by light from said single beam after passage through any transparent portion of said support which is brought into registry with said beam and which is not covered by said sheet.

2. Facsimile apparatus according to claim 1 in which said support is in the form of a cylindrical drum of light transparent material, said auxiliary cell being mounted externally of said drum, and a light reflecting member within said drum for reflecting the said single scanning beam back to said auxiliary cell after passage through said uncovered portion of the drum.

3. Apparatus comprising a transmitting scanning drum of light transparent material, to hold for scanning purposes a sheet of copy subject matter which leaves portions of the drum periphery along both its length and width uncovered by said sheet, a facsimile scanner including an exciter lamp for illuminating a restricted area of the surface of said sheet with a single scanning beam, said scanner including a main light sensitive cell responsive to the scanning beam as reflected from said copy sheet, an auxiliary light sensitive cell in optical alignment with said scanning light beam whereby it is excited by said single beam whenever the beam is not intercepted by the copy sheet, and means connected to said auxiliary cell for generating a gating control signal for the facsimile intelligence signal.

4. Facsimile apparatus according to claim 3, in which said auxiliary cell is stationarily mounted externally of said drum, and a light reflecting mirror is stationarily mounted internally of said drum to reflect said scanning beam after passage through said uncovered portion of said drum back to said auxiliary cell.

5. Facsimile apparatus according to claim 3, in which said auxiliary cell is stationarily mounted within said drum and the inside surface of said drum is frosted to reflect said light beam when it passes through said uncovered portion of the drum on to said auxiliary cell.

6. Facsimile apparatus according to claim 3, in which said auxiliary cell is mounted internally of said drum and a Fresnel lens is located between said cell and the internal wall of the drum.

7. Facsimile apparatus according to claim 3, in which said auxiliary cell is movably mounted within said drum to maintain it in optical alignment with said scanning beam as said beam is executing its scanning traverse.

8. Facsimile apparatus comprising a cylindrical transparent scanning drum arranged to support subject matter which incompletely masks the peripheral surface of the drum, a scanning head for scanning said subject matter in successive elemental areas by light reflection therefrom, said scanning head including a single light source and a main light sensitive cell for generating facsimile signals representing the lights and shades of the subject matter being scanned, a signal transmission gating control device between said main cell and an output transmission terminal, an auxiliary light sensitive cell for generating transmission gating control signals, said auxiliary cell being located within the drum and arranged to be excited by said single scanning light source when exposed through any portion of the drum surface unmasked by said subject matter, and circuit means connecting said auxiliary cell to said gating control device to close said device whenever said auxiliary cell is exposed to said scanning light.

9. Facsimile apparatus according to claim 8, in which said cell is provided with a Fresnel lens located within the drum between the auxiliary cell and the wall of the drum.

10. Facsimile apparatus according to claim 8, in which said auxiliary cell is located within the drum and is mounted in optical alignment with the said single scanning light source.

11. Facsimile apparatus comprising a support for a subject matter to be translated into corresponding electric facsimile signals, said support having a predetermined useful total scanning area to accommodate subject matters of different areas, a scanning head including a main light sensitive cell and means to develop a single scanning light beam, means to produce relative motion between said support and head to bring successive areas of the support into registry with said beam to generate said signals, and means also controlled by said single beam when the subject matter does not completely cover said useful scanning area and effective when an uncovered area of said support is in registry with said beam to generate a gating control signal for said facsimile signals.

12. Facsimile apparatus according to claim 11 in which the last-mentioned means includes an auxiliary light sensitive cell, and light directing means for directing the light from said single beam when it passes through said uncovered area on to said auxiliary cell.

References Cited in the file of this patent

UNITED STATES PATENTS

| | | |
|---|---|---|
| 2,182,000 | Nichols | Dec. 5, 1939 |
| 2,695,925 | Pollard | Nov. 30, 1954 |
| 2,721,231 | Wise | Oct. 18, 1955 |